US011811336B2

United States Patent
Green et al.

(10) Patent No.: US 11,811,336 B2
(45) Date of Patent: Nov. 7, 2023

(54) PIEZOELECTRIC BASED PALLET GENERATOR FOR DEVICE CHARGING

(71) Applicant: INTERNATIONAL BUSINESS MACHINES CORPORATION, Armonk, NY (US)

(72) Inventors: William J Green, Cary, NC (US); Cedric D. Cook, Richmond, TX (US); Myneeka Holloway, Austin, TX (US); Jimmie Lamar Powell, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 16/939,436

(22) Filed: Jul. 27, 2020

(65) Prior Publication Data
US 2022/0029560 A1    Jan. 27, 2022

(51) Int. Cl.
*H02N 2/18* (2006.01)
*B65D 19/00* (2006.01)
*B65D 19/38* (2006.01)

(52) U.S. Cl.
CPC .......... *H02N 2/186* (2013.01); *B65D 19/0095* (2013.01); *B65D 19/38* (2013.01);
(Continued)

(58) Field of Classification Search
CPC ..................................................... H02N 2/186
See application file for complete search history.

(56) References Cited

U.S. PATENT DOCUMENTS 6,737,789 B2    5/2004   Radziemski
7,038,585 B2    5/2006   Hall
(Continued)

FOREIGN PATENT DOCUMENTS

CN    108233768 A    6/2018
EP    25360201 B1    2/2016
(Continued)

OTHER PUBLICATIONS

IBM, List of IBM Patents or Patent Applications Treated as Related, Appendix P, dated Jul. 29, 2020, 2 pages.
(Continued)

*Primary Examiner* — Bryan P Gordon
(74) *Attorney, Agent, or Firm* — Tihon Poltavets (57) ABSTRACT

A piezoelectric generator structure disposed between an upper platform and a lower platform that includes a lower piezoelectric pad, an upper piezoelectric pad, and a connecting shaft. The lower piezoelectric pad coupled to the upper piezoelectric pad via the connecting shaft, where the lower piezoelectric pad is configured to compress under a downward motion of the upper platform during a compression movement due to an additional load being applied to an existing load on a top surface of the upper platform, where the lower piezoelectric pad produces a first voltage due to the compression movement. The upper piezoelectric pad configured to compress under an upward motion of the upper platform during a rebound movement of the upper platform, where the upper piezoelectric pad produces a second voltage due to the rebound movement. The generator structure configured to provide the first and the second voltage to a coupled power storage unit.

20 Claims, 5 Drawing Sheets

(52) U.S. Cl.
CPC .............. *B65D 2519/00029* (2013.01); *B65D 2519/00034* (2013.01); *B65D 2519/00129* (2013.01); *B65D 2519/00273* (2013.01); *B65D 2519/00293* (2013.01); *B65D 2519/00323* (2013.01); *B65D 2519/00333* (2013.01); *B65D 2519/00378* (2013.01); *B65D 2519/00736* (2013.01)

(56) References Cited

U.S. PATENT DOCUMENTS

| | | | |
|---|---|---|---|
| 7,847,421 | B2 | 12/2010 | Gardner |
| 8,154,177 | B1 | 4/2012 | Churchill |
| 8,729,747 | B2 | 5/2014 | Arnold |
| 10,033,304 | B2 | 7/2018 | Feng |
| 10,044,018 | B2 | 8/2018 | Soleski |
| 2003/0034697 | A1 | 2/2003 | Goldner |
| 2007/0090723 | A1* | 4/2007 | Keolian .................. H02N 2/18 310/311 |
| 2007/0114890 | A1 | 5/2007 | Churchill |
| 2007/0284969 | A1 | 12/2007 | Xu |
| 2012/0161583 | A1* | 6/2012 | Kang .................. H10N 30/30 310/339 |
| 2019/0033172 | A1 | 1/2019 | Montemurro |
| 2019/0190550 | A1 | 6/2019 | Williams |
| 2020/0076288 | A1* | 3/2020 | Nerubenko ........... F16F 7/1005 |
| 2021/0313508 | A1* | 10/2021 | Yoon ..................... H02N 2/04 |
| 2021/0359584 | A1* | 11/2021 | Lewis ..................... H02K 5/22 |

FOREIGN PATENT DOCUMENTS

| | | |
|---|---|---|
| GB | 2475497 A | 5/2011 |
| JP | 2002004620 A | 1/2002 |
| KR | 101064100 B1 | 9/2011 |

OTHER PUBLICATIONS

Pending U.S. Appl. No. 16/939,417, filed Jul. 27, 2020, entitled: "Faraday Based Pallet Generator for Device Charging", 33 pages.

O'Connor et al., "Power Management Circuit for Kinetic Energy Harvesting from Freight Railcars", IEEE, 2017, https://ieeexplore.ieee.org/search/searchresult.jsp?newsearch=true&queryText=power%20management%20circuit%20for%20kinetic%20energy%20harvesting%20from%20freight%20railcars, pp. 1-4.

Shirvanimoghaddam et al., "Towards a Green and Self-Powered Internet of Things Using Piezoelectric Energy Harvesting", https://arxiv.org/pdf/1712.02277.pdf, 2019 IEEE., pp. 1-16.

* cited by examiner

PIEZOELECTRIC BASED PALLET GENERATOR FOR DEVICE CHARGING

FIELD OF THE INVENTION

This disclosure relates generally to device charging and stabilization, and in particular, a piezoelectric based generator integrated into a pallet for device charging.

BACKGROUND OF THE INVENTION

Presently, various companies utilize a wide range of devices that require electricity, including Internet of Things (IoT) sensors with enabled Global Positioning System (GPS) to monitor a position and status of a shipment (e.g., server equipment) during transit between an origin location and a destination location. The status of the shipment is monitored by collecting various data during transit that includes shock, vibration, tilt, temperature, humidity, and light readings. For shipments with extensive transit times (e.g., ground shipments, weather related delays) the IoT sensors can experience a depletion of power reserves, thus resulting in missing data for the position and the status of the shipment.

SUMMARY

One aspect of an embodiment of the present invention discloses an apparatus for a piezoelectric generator structure, the apparatus comprising the piezoelectric generator structure disposed between an upper platform and a lower platform, wherein the piezoelectric generator structure includes a lower piezoelectric pad, an upper piezoelectric pad, and a connecting shaft. The apparatus further comprising the lower piezoelectric pad mechanically and electrically coupled to the upper piezoelectric pad via the connecting shaft, wherein the lower piezoelectric pad is configured to compress under a downward motion of the upper platform during a compression movement due to an additional load being applied to an existing load on a top surface of the upper platform, wherein the lower piezoelectric pad produces a first voltage due to the compression movement. The apparatus further comprising the upper piezoelectric pad configured to compress under an upward motion of the upper platform during a rebound movement of the upper platform, wherein the upper piezoelectric pad produces a second voltage due to the rebound movement. The apparatus further comprising the generator structure configured to provide the first voltage and the second voltage to an electrically coupled power storage unit.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Embodiments of the present invention provide a piezoelectric generator structure integrated into a pallet, where the piezoelectric generator structure is disposed between an upper platform and a lower platform of the pallet. The piezoelectric generator structure utilizes additional forces (e.g., shock, vibration) applied to the upper platform which includes a previously applied load (i.e., shipment), to generate charge for one or more electronic devices associated with the pallet or the previously applied load. As the additional force is translated to the piezoelectric generator structure, energy is harvested and utilized to generate electrical power to charge a battery or capacitor for providing charge to the one or more electronic devices.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure or first member, is present on a second element, such as a second structure or second member, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
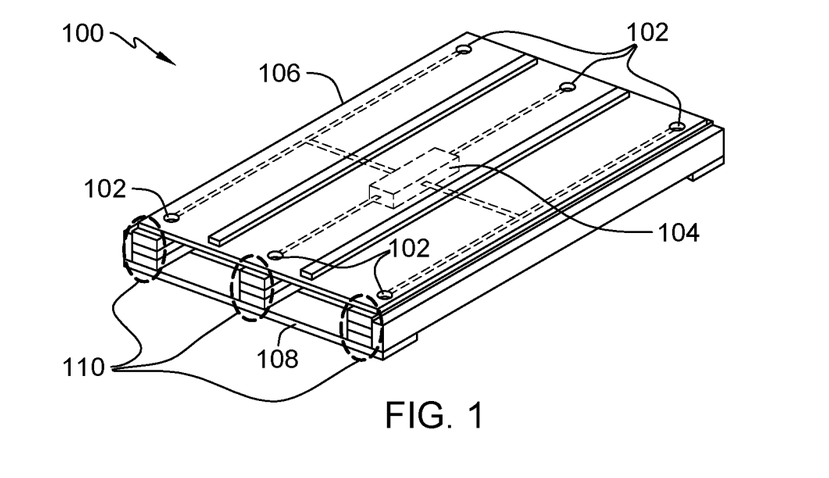
FIG. 1 depicts a pallet with multiple integrated piezoelectric generator structures and electronic device, in accordance with an embodiment of the present invention.

FIG. 1 depicts a pallet with multiple integrated piezoelectric generator structures and electronic device, in accordance with an embodiment of the present invention. Pallet 100 includes multiple piezoelectric generator structures 102 electrically coupled to an electronic device 104, where each piezoelectric generator structure 102 is positioned at various points of pallet 100. Electronic device 104 is electrically coupled to the multiple piezoelectric generator structures 102 utilizing one or more of cables, electrical contact pads, inductive charging, or other mediums for transferring electrical current. Pallet 100 includes upper platform 106 and lower platform 108, where a lower surface of upper platform 106 is disposed on a top surface of supporting structures 110 and a lower surface of supporting structures 110 are disposed on a top surface of lower platform 108. The combination of upper platform 106, lower platform 108, and support structures 110 form pallet 100. In this embodiment, multiple piezoelectric generator structure 102 are positioned at various points on pallet 100 between supporting structures 110 and upper platform 106. In other embodiments, a single piezoelectric generator structure 102 is positioned along at least a portion of a length of each supporting structure 110 to maximize an area of compression between supporting structure 110 and upper platform 106. Supporting structure 110 can be a cushioning dampening material (e.g., foam, deformable plastic, corrugated cardboard), a solid material (e.g., wood, rigid plastic), or a combination of a solid material and a dampening material.

In this embodiment, electronic device 104 is integrated into pallet 100, where electronic device 104 can be positioned at any location on pallet 100, such that electronic device 104 does not interfere with a load placed on a top surface of upper platform 106. In one example, electronic device 104 is positioned between upper platform 106 and lower platform 108 in a cavity of supporting structures 110. In another example, electronic device 104 is positioned on a perimeter edge of upper platform 106. Electronic device 104 represents any device (e.g., IoT device) with one or more integrated sensors capable of capturing data readings that include position, shock, vibration, tilt, temperature, humidity, light, and any other pertinent data for monitoring a shipment during transit between an origin location and a destination location. In this embodiment, each piezoelectric generator structure 102 includes a coupled power storage unit (e.g., battery, supercapacitor), where each piezoelectric generator structure 102 is capable of supplying power to electronic device 104. Electronic device 104 includes an integrated power storage for primary power, where secondary power (e.g., backup power) for electronic device 104 is sourced from the power storage units coupled to piezoelectric generator structures 102. Alternatively, each piezoelectric generator structure 102 directly provides charge to an integrated power storage of electronic device 104.

Figure 2:
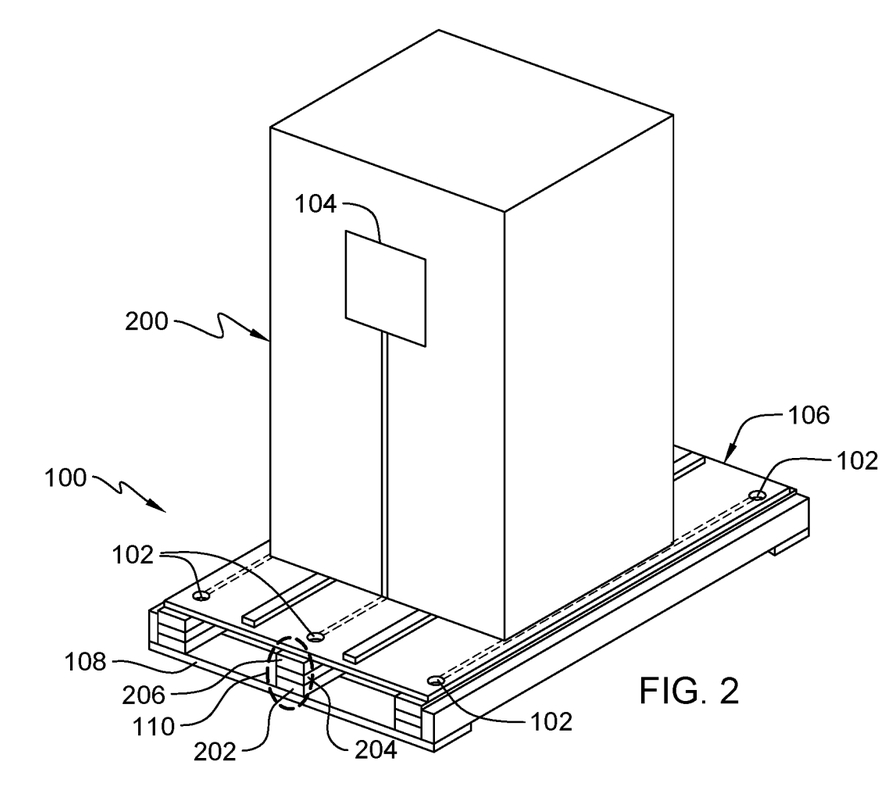
FIG. 2 depicts a pallet with multiple integrated piezoelectric generator structures electrically coupled to an electronic device mounted to a shipment, in accordance with an embodiment of the present invention.

FIG. 2 depicts a pallet with multiple integrated piezoelectric generator structures electrically coupled to an electronic device mounted to a shipment, in accordance with an embodiment of the present invention. In this embodiment, electronic device 104 is attachable to shipment 200 (e.g., server equipment), where shipment 200 is disposed on upper platform 106 of pallet 100 and electronic device is electrically coupled to the multiple piezoelectric generator structures 102. A type and mounting location of electronic device 104 affixed to shipment 200 allows for shipment specific customization, where any type of electronic device 104 is capable of being electrically coupled to the multiple piezoelectric generator structures 102 for supplement power and charging capabilities. In other embodiment, the multiple piezoelectric generator structures 102 are electrically coupled to electronic device 104 and one or more other electrical devices (e.g., auxiliary fan, dehumidifier) to provide supplement power and charging capabilities.

In this embodiment, each supporting structure 110 includes dampening material 204 positioned between first solid material 202 and second solid material 206. First solid material 202 is disposed on a top surface of lower platform 108, dampening material 204 is disposed on a top surface of first solid material 202, second solid material 206 is disposed on a top surface of dampening material 204, and a bottom surface of upper platform 106 is disposed on a top surface of second solid material 206. Damping material 204 provides a vertical movement (i.e., y-axis) of upper platform 106 with respect to lower platform 108, where the vertical movement allows for each of the multiple piezoelectric generator structures 102 to generate power. In some embodiments, a deflection and rebound of upper platform 106 also provides a vertical movement with respect to lower platform 108, where one or more piezoelectric pads of each piezoelectric generator structure 102 generates power.

Figure 3A:
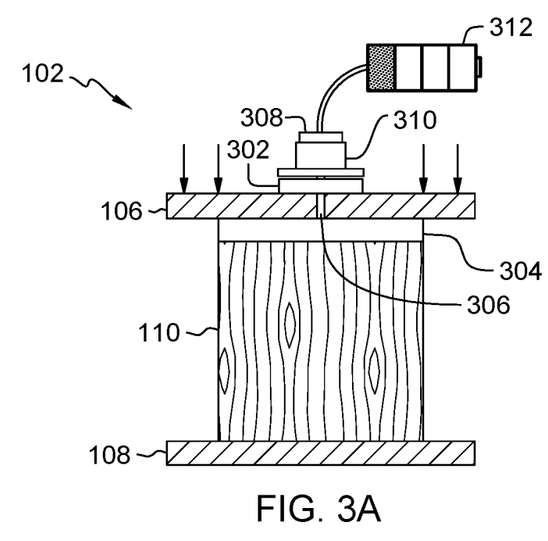
FIG. 3A depicts a piezoelectric generator structure with a load being applied to an upper platform of a pallet in a compression transition state, in accordance with an embodiment of the present invention.

FIG. 3A depicts a piezoelectric generator structure with a load being applied to an upper platform of a pallet in a compression transition state, in accordance with an embodiment of the present invention. In this embodiment, piezoelectric generator structure 102 includes upper piezoelectric pad 302 and lower piezoelectric pad 304, where connecting shaft 306 is disposed and slidable in an aperture of upper platform 106. Connecting shaft 306 mechanically and electrically couples the upper piezoelectric pad 302 and lower piezoelectric pad 304. Supporting structure 110 is disposed on a top surface of lower platform 108, lower piezoelectric pad 304 is disposed on a top surface of supporting structure 110, and upper platform 106 is disposed on a top surface of lower piezoelectric pad 304. In this embodiment, supporting structure 110 is a solid material (e.g., wood, rigid plastic). As previously discussed, supporting structure 110 can be a cushioning dampening material (e.g., foam, deformable plastic, corrugated cardboard), a solid material, or a combination of a solid material and a dampening material. For example, supporting structure 110 can include a solid material disposed on a top surface of lower platform 108, a dampening material disposed on a top surface of the solid material, and lower piezoelectric pad 304 disposed on a top surface of the dampening material. Upper piezoelectric pad 302 and lower piezoelectric pad 304 produce piezoelectricity which is an appearance of electrical potential (i.e., voltage) across the sides of crystal (e.g., quartz) of upper piezoelectric pad 302 and lower piezoelectric pad 304 when subjected to mechanical stress. The mechanical stress represents compression of upper piezoelectric pad 302 and lower piezoelectric pad 304 when an additional force applied (i.e., vibration, shock) to upper platform 106 due to movement during transit. In other embodiments, a third piezoelectric id disposed between supporting structure 110 and lower platform 108.

Connecting shaft 306 includes top end 308 to secure cap 310 and upper piezoelectric pad 302, where upper piezoelectric pad 302 is disposed on a top surface of upper platform 106, cap 310 is disposed on a top surface of upper piezoelectric pad 302, and top end 308 secures the assembly of piezoelectric generator structure 102. Cap 310 secures upper piezoelectric pad 302 to upper platform 106, where an upward motion of upper platform 106 compresses upper piezoelectric pad 302. Though the illustrated embodiment includes upper piezoelectric pad 302 for generating additional power, upper piezoelectric pad 302 is not necessary and represents an additional source for producing charge in a rebound state of piezoelectric generator structure 102, discussed in further detail with regards to FIGS. 3A and 4D. The compression transition state represents a load that is experiencing an additional force being applied to a top surface of upper platform 106 due to movement during transit, where lower piezoelectric pad 304 compresses and upper platform 106 moves in a downward direct relative to lower platform 108. Voltage indicator 312 illustrates that voltage is created while transitioning from the initial state to the compression transition state, where lower piezoelectric pad 304 experiences mechanical stress due to compression.

Figure 3B:
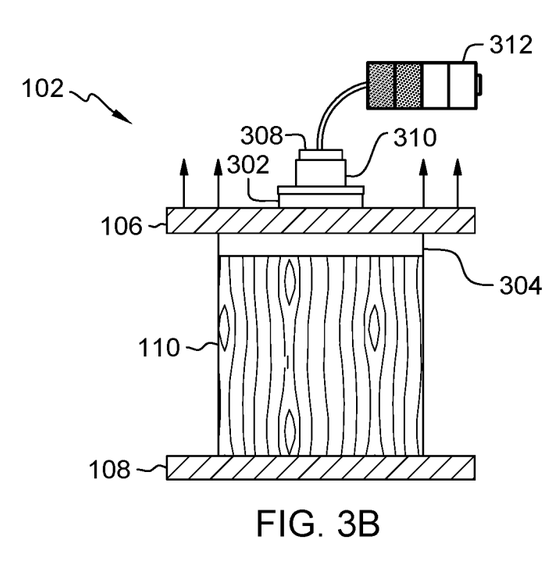
FIG. 3B depicts a piezoelectric generator structure with a load being applied to an upper platform of a pallet in a rebound transition state, in accordance with an embodiment of the present invention.

FIG. 3B depicts a piezoelectric generator structure with a load being applied to an upper platform of a pallet in a rebound transition state, in accordance with an embodiment of the present invention. The rebound state represents a load that is no longer experiencing the effects of the additional force that was applied to a top surface of upper platform 106 due to movement during transit, where lower piezoelectric pad 304 rebounds to the initial state. In this embodiment, piezoelectric generator structure 102 utilizes upper piezoelectric pad 302 which exploits the upward directional movement (i.e., +y-axis) of upper platform 106 relative to lower platform 108 during the rebound movement. As upper platform 106 moves in the upward direction, upper piezoelectric pad 302 is compressed between a top surface of upper platform 106 and cap 310, where top end 318 of connecting shaft 306 limits movement of cap 310. As previously mentioned above, upper piezoelectric pad 302 is not necessary and represents an additional source for producing charge in a rebound state of piezoelectric generator structure 102. Voltage indicator 312 illustrates that voltage is further created while completing the transition to the rebound state by compressing upper piezoelectric pad 302, where upper piezoelectric pad 302 experiences mechanical stress due to compression.

Figure 4A:
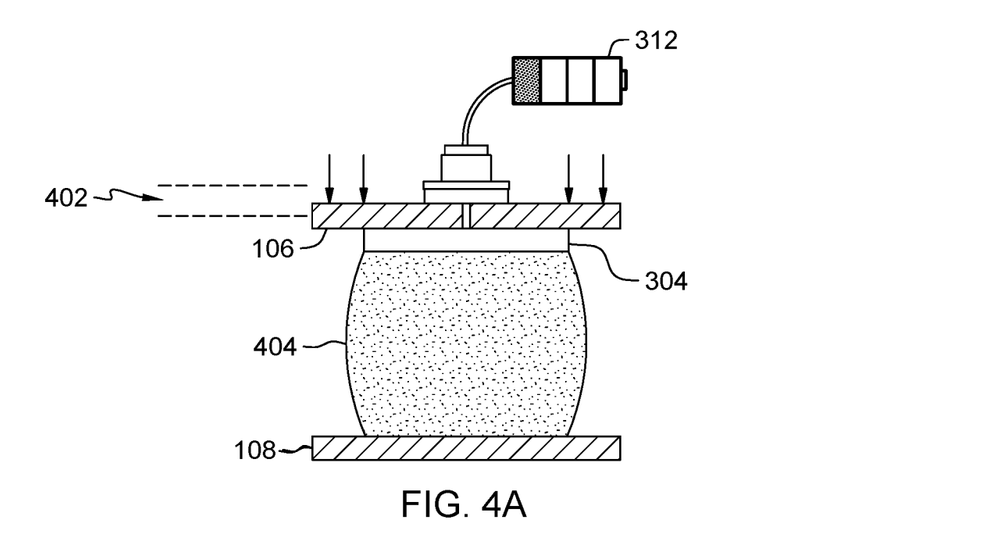
FIG. 4A depicts a piezoelectric generator structure with a damper in a compression transition state, in accordance with an embodiment of the present invention.

FIG. 4A depicts a piezoelectric generator structure with a damper in a compression transition state, in accordance with an embodiment of the present invention. The compression transition state represents a load that is experiencing an additional force being applied to a top surface of upper platform 106 due to movement during transit, where dampener 404 compresses and upper platform 106 moves in a downward direct relative to lower platform 108. As dampener 404 compresses, upper platform 106 travels partial distance 402 in the down direction (i.e., −y-axis), while providing mechanical stress to lower piezoelectric pad 304. Voltage indicator 312 illustrates that voltage is created while transitioning from the initial state to the compression transition state, where lower piezoelectric pad 304 experiences mechanical stress due to compression.

Figure 4B:
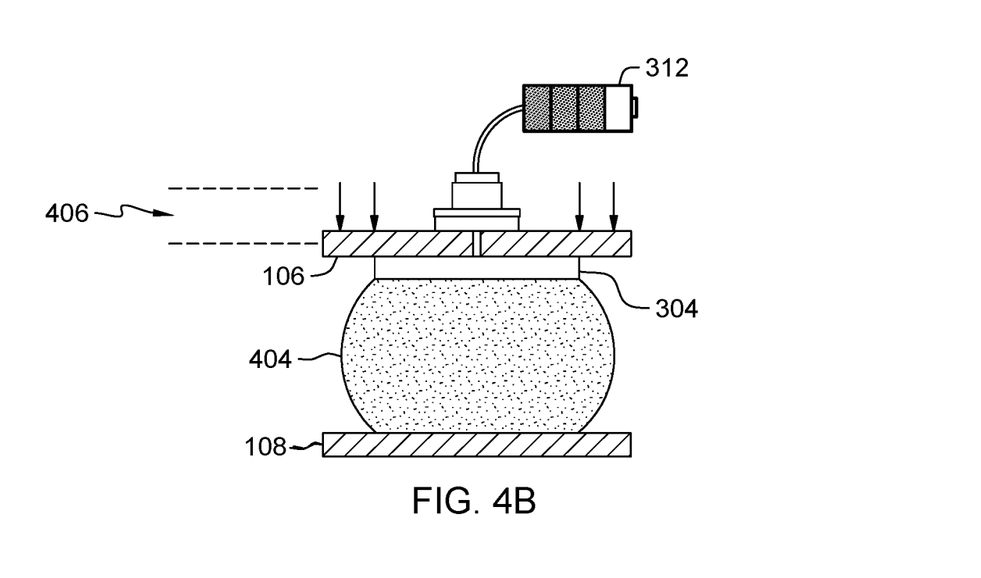
FIG. 4B depicts a piezoelectric generator structure with a damper in a compressed state, in accordance with an embodiment of the present invention.

FIG. 4B depicts a piezoelectric generator structure with a damper in a compressed state, in accordance with an embodiment of the present invention. The compressed state represents a load that is experiencing an additional force being applied to a top surface of upper platform 106 due to movement during transit, where dampener 404 reaches maximum compression due to the additional force. As dampener 404 compresses, upper platform 106 travels compressed distance 406 in the down direction (i.e., −y-axis) relative to lower platform 108. Voltage indicator 312 illustrates that voltage is further created while transitioning between the transition compression state to the compressed state, where lower piezoelectric pad 304 experiences further mechanical stress due to compression.

Figure 4C:
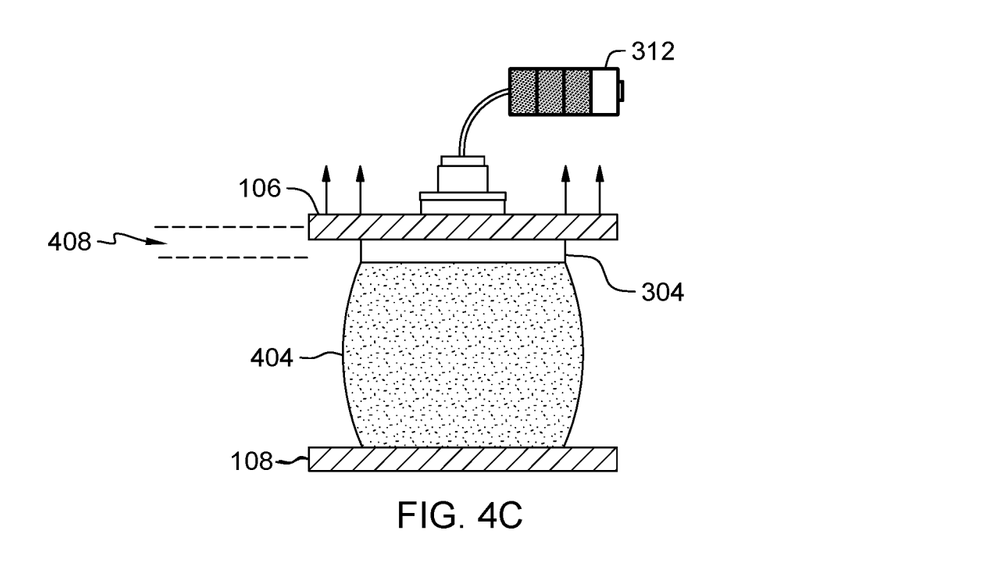
FIG. 4C depicts a piezoelectric generator structure with a damper in a rebound transition state, in accordance with an embodiment of the present invention.

FIG. 4C depicts a piezoelectric generator structure with a damper in a rebound transition state, in accordance with an embodiment of the present invention. The rebound transition state represents a load that is no longer experiencing the effects of the additional force that was applied to a top surface of upper platform 106 due to movement during transit, resulting in dampener 404 transitioning back to the initial state. As dampener 404 rebounds, upper platform 106 travels partial rebound distance 408 in the upward direction (i.e., +y-axis) relative to lower platform 108. Voltage indicator 312 illustrates that voltage is further created while transitioning between the compressed state to the rebound transition state, where lower piezoelectric pad 304 no longer experiences mechanical stress due to compression.

Figure 4D:
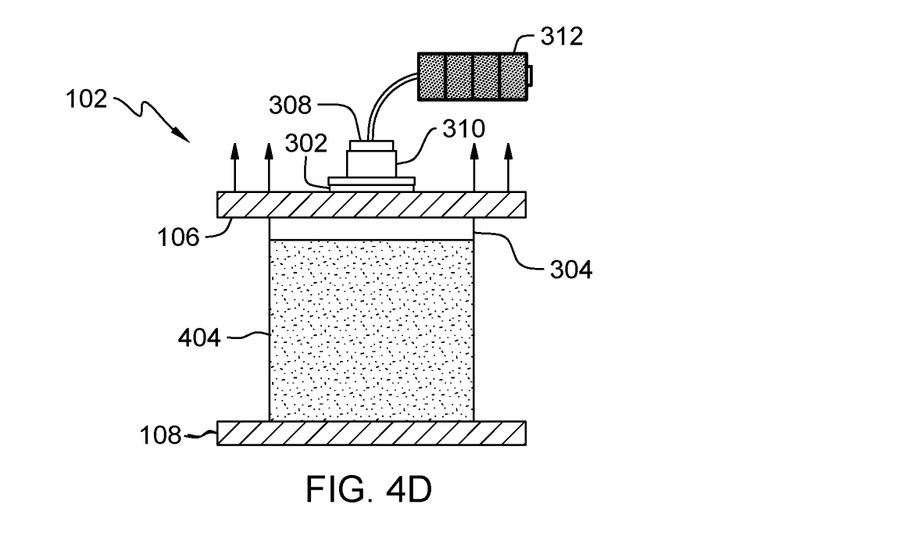
FIG. 4D depicts a piezoelectric generator structure with a damper in a rebound state, in accordance with an embodiment of the present invention.

FIG. 4D depicts a piezoelectric generator structure with a damper in a rebound state, in accordance with an embodiment of the present invention. The rebound state represents a load that is no longer experiencing the effects of the additional force that was applied to a top surface of upper platform 106 due to movement during transit, where dampener 404 has fully rebounded to the initial state. In this embodiment, piezoelectric generator structure 102 utilizes upper piezoelectric pad 302 which exploits the upward directional movement (i.e., +y-axis) of upper platform 106 relative to lower platform 108 during the rebound movement of dampener 404. As upper platform 106 moves in the upward direction, upper piezoelectric pad 302 is compressed between a top surface of upper platform 106 and cap 310, where top end 308 limits movement of cap 310. As previously mentioned above, upper piezoelectric pad 302 is not necessary and represents an additional source for producing charge in a rebound state of piezoelectric generator structure 102. Voltage indicator 312 illustrates that voltage is further created while completing the transition to the rebound state by compressing upper piezoelectric pad 302, where upper piezoelectric pad 302 experiences mechanical stress due to compression.

Figure 5:
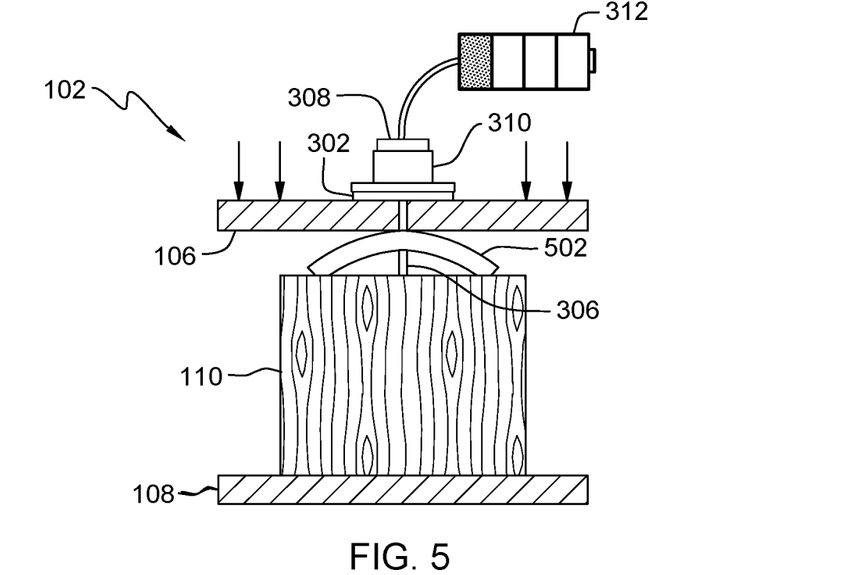
FIG. 5 depicts a piezoelectric generator structure with a curved piezoelectric pad and a load being applied to an upper platform of a pallet, in accordance with an embodiment of the present invention.

FIG. 5 depicts a piezoelectric generator structure with a curved piezoelectric pad and a load being applied to an upper platform of a pallet, in accordance with an embodiment of the present invention. In this embodiment, piezoelectric generator structure 102 includes upper piezoelectric pad 302 and curved piezoelectric pad 502, where connecting shaft 306 is disposed and slidable in an aperture of upper platform 106. Curved piezoelectric pad 502 can be utilized for lighter loads applied to a top surface of upper platform 106. Connecting shaft 306 mechanically and electrically couples the upper piezoelectric pad 302 and curved piezoelectric pad 502. Supporting structure 110 is disposed on a top surface of lower platform 108, curved piezoelectric pad 502 is disposed on a top surface of supporting structure 110, and upper platform 106 is disposed on a top surface of lower piezoelectric pad 304. Upper piezoelectric pad 302 and curved piezoelectric pad 502 produce piezoelectricity which is an appearance of electrical potential (i.e., voltage) across the sides of crystal (e.g., quartz) of upper piezoelectric pad 302 and curved piezoelectric pad 502 when subjected to mechanical stress. The mechanical stress represents compression of upper piezoelectric pad 302 and curved piezoelectric pad 502 when an additional force applied (i.e., vibration, shock) to upper platform 106 due to movement during transit.

Connecting shaft 306 includes top end 308 to secure cap 310 and upper piezoelectric pad 302, where upper piezoelectric pad 302 is disposed on a top surface of upper platform 106, cap 310 is disposed on a top surface of upper piezoelectric pad 302, and top end 308 secures the assembly of piezoelectric generator structure 102. Cap 310 secures upper piezoelectric pad 302 to upper platform 106, where an upward motion of upper platform 106 compresses upper piezoelectric pad 302. In this embodiment, curved piezoelectric pad 502 is coupled to a shape-memory alloy (e.g., copper-aluminum-nickel, nickel-titanium), where the shape-memory alloy dictates a shape of curved piezoelectric pad 502. For example, in a heated initial state the shape-memory alloy is flat and in a cold final state the shape-memory alloy provides a curved shape to curved piezoelectric pad 502.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. An apparatus for a piezoelectric generator structure, the apparatus comprising:
   the piezoelectric generator structure disposed between an upper platform and a lower platform, wherein the piezoelectric generator structure includes a lower piezoelectric pad, an upper piezoelectric pad, and a connecting shaft;
   the lower piezoelectric pad mechanically and electrically coupled to the upper piezoelectric pad via the connecting shaft, wherein the lower piezoelectric pad is configured to compress under a downward motion of the upper platform during a compression movement due to an additional load being applied to an existing load on a top surface of the upper platform, wherein the lower piezoelectric pad produces a first voltage due to the compression movement;
   the upper piezoelectric pad configured to compress under an upward motion of the upper platform during a rebound movement of the upper platform, wherein the upper piezoelectric pad produces a second voltage due to the rebound movement; and
   the generator structure configured to provide the first voltage and the second voltage to an electrically coupled power storage unit.

2. The apparatus of claim 1, wherein the upper platform, the lower platform, and a supporting structure disposed between the upper platform and the lower platform form a pallet.

3. The apparatus of claim 2, wherein the upper platform is configured to move in a vertical direction relative to the lower platform as dictated by the compression movement and the rebound movement.

4. The apparatus of claim 3, further comprising:
   the supporting structure disposed on the top surface of the lower platform;
   the lower piezoelectric pad disposed on a top surface of the supporting structure; and
   the upper platform disposed on a top surface of the supporting structure, wherein the connecting shaft is disposed in an aperture of the upper platform for directing the compression movement and the rebound movement.

5. The apparatus of claim 4, wherein the supporting structure is of a dampening material selected from the group consisting of: foam, deformable plastic, and corrugated cardboard.

6. The apparatus of claim 4, wherein the supporting structure is of a solid material selected from the group consisting of: wood and rigid plastic.

7. The apparatus of claim 1, further comprising:
   a top end of the connecting shaft secures the piezoelectric generator structure to the upper platform.

8. The apparatus of claim 7, further comprising:
   a cap structure configured to secure the upper piezoelectric pad to the top surface of the upper platform; and
   the top end of the connecting shaft configured to secure the cap structure, wherein the connecting shaft is disposed in an aperture of the upper piezoelectric pad and an aperture of the cap structure.

9. The apparatus of claim 8, wherein the upper piezoelectric pad is configured to compress between the cap structure and the top surface of the upper platform during the rebound movement.

10. The apparatus of claim 9, wherein the upper piezoelectric pad is further configured to compress between the cap structure and the top surface of the upper platform during a deflection of the upper platform.

11. The apparatus of claim 4, wherein the lower piezoelectric pad is further configured to compress between the upper platform and the supporting structure, during a deflection of the upper platform.

12. The apparatus of claim 1, wherein the power storage unit is disposed between the upper platform and the lower platform.

13. The apparatus of claim 1, wherein the power storage unit is associated with an electronic device, wherein the electronic device is electrically coupled to the piezoelectric generator structure.

14. The apparatus of claim 13, wherein the electronic device includes one or more sensors for capture readings selected from a group consisting of: position, shock, vibration, tilt, temperature, humidity, and light.

15. The apparatus of claim 14, wherein the electronic device is disposed between the upper platform and the lower platform.

16. The apparatus of claim 14, wherein the electronic device is affixed to the existing load disposed on the top surface of the upper platform.

17. The apparatus of claim 1, wherein the lower piezoelectric pad is coupled to a shape-memory alloy.

18. The apparatus of claim 17, wherein the connecting shaft couples the lower piezoelectric pad to the shape-memory alloy.

19. The apparatus of claim 18, wherein a shape of the shape-memory alloy in a final state dictates a shape of the lower piezoelectric pad.

20. The apparatus of claim 19, wherein the shape-memory alloy is an alloy combination selected from a group consisting of: copper-aluminum-nickel and nickel-titanium.

\* \* \* \* \*